(12) United States Patent
Beattie

(10) Patent No.: US 6,471,518 B1
(45) Date of Patent: Oct. 29, 2002

(54) TEACHING DEVICE FOR INDICATING STRUCTURE OF VARIOUS ORGANS IN A BODY

(76) Inventor: Sally Beattie, #6 Edgewood Ave., Columbia, MO (US) 65203

(*) Notice: Subject to any disclaimer, the term of this patent is extended or adjusted under 35 U.S.C. 154(b) by 167 days.

(21) Appl. No.: 09/608,349
(22) Filed: Jun. 29, 2000
(51) Int. Cl.[7] .............................................. G09B 23/28
(52) U.S. Cl. ...................................... 434/272; 434/267
(58) Field of Search ................................ 434/262, 264, 434/267, 270, 272; 446/327, 329; 2/160, 167

(56) References Cited

U.S. PATENT DOCUMENTS

| | | | | |
|---|---|---|---|---|
| 4,404,460 A | * | 9/1983 | Kerr | 219/211 |
| 4,828,529 A | * | 5/1989 | Steele | 446/327 |
| 5,080,626 A | * | 1/1992 | Maddi | 446/329 |
| 5,199,876 A | * | 4/1993 | Waldman | 434/262 |
| 5,253,367 A | * | 10/1993 | Lappley | 2/161.3 |
| 5,662,477 A | * | 9/1997 | Miles | 434/185 |
| 5,749,098 A | * | 5/1998 | Evans | 2/123 |
| 5,820,526 A | * | 10/1998 | Hoffman | 482/55 |
| 6,233,742 B1 | * | 5/2001 | Yungkurth | 2/160 |

* cited by examiner

Primary Examiner—Derris H. Banks
Assistant Examiner—Kurt Fernstrom
(74) Attorney, Agent, or Firm—Haverstock, Garrett & Roberts; Veo Peoples; Holly Amjad

(57) ABSTRACT

The present invention is for a three-dimensional device for teaching the important structures and functions of an organ in a body in order to increase an individual's understanding of the organ and possible medical problems involving the organ. An individual places the glove-like or mitten-like three-dimensional device on his hand and positions his hand in such a way as to accentuate the three-dimensional aspect of the device, then places that hand on his own body to indicate the general location of the organ of interest.

23 Claims, 8 Drawing Sheets

TEACHING DEVICE FOR INDICATING STRUCTURE OF VARIOUS ORGANS IN A BODY

TECHNICAL FIELD

The present invention relates generally to a three-dimensional device for teaching anatomy of a body, and more particularly, to a three-dimensional device for teaching the important anatomical landmarks of a specific organ in a body to increase an individual's understanding of the organ along with possible medical problems and complications involving the organ.

BACKGROUND

It is important that patients are fully informed with regards to the medical treatment and procedures they are required to undergo. Today, patients are spending less and less time in the hospital during the acute phase of their illness, leaving healthcare professionals with diminished opportunities to help the patient understand what is happening to them. For example, with regards to the heart; in the event of a potential or actual myocardial infarction, a patient may emergently need to go to the cardiac catheterization lab for a coronary angiogram. In other instances, an electrophysiology study requiring delineation of an electrical problem in the heart's conduction system may be indicated. It is frequently difficult for patients who do not have a medical background to understand the explanations of these treatments and procedures given by healthcare professionals, especially as medical treatment can involve some of the most sophisticated technology and complex concepts known today. It would be helpful if these healthcare professionals had a simplified model or diagram they could use to facilitate the explanation of the treatment or procedure to the patients and their families. It is also important for the healthcare professional to be able to explain the medical treatment without having a language or formal schooling barrier impose restrictions on the patient's understanding.

Most healthcare professionals currently use some sort of stand alone model of the organ of interest or rely on books showing the anatomy of the organs of the body. Problems arise with relying on stand alone models of the organ of interest. First of all, they are not readily available when needed and are cumbersome to handle. The healthcare professional must move the model to where the patient is and this is not always convenient or possible. Second, these models can be rather expensive. Problems also arise when using books showing the anatomy of the body. Pictures are one-dimensional making it difficult for the patient to truly understand the three dimensional structure of the organ and how the problem involved effects the organ of interest. Relying on anatomy books also makes it difficult for the patient to understand the location of the organ of interest in the body.

In the current climate of increased interest in living a healthy life style, it would be helpful for teachers to have a simplified model of human organs to use as tools for teaching the location of various organs in the body along with some of the simple structural landmarks of these organs, in order to facilitate motivating the students to cultivate healthy habits for caring for their bodies and living healthier lives. Teaching students about the different organs that make up their body and the problems that can arise from unwise life choices will increase their awareness and could increase their desire to make healthier decisions. These models could also be useful in medical, nursing or medical assistant learning programs to help the medical and/or nursing student better understand the organ. As discussed above, stand alone models are cumbersome for the teacher to use and with the budgetary limits on most school systems are frequently too expensive to be practical; while books showing the organs in one dimension rarely hold the students' interest. It would also be helpful in the field of veterinary medicine to have simple, easy to use models of organs of various animals as teaching tools for pet owners and veterinary students or assistants.

What is required in all of these settings is a simple, three-dimensional device which the patient and/or student can readily understand and easily use to understand the organ's place and function in the body. This device should be easy to carry and store, should not be cost prohibitive and should allow the patient, family member and/or student to have a real "hands-on" experience when using this device.

DISCLOSURE OF THE INVENTION

The present invention relates generally to a device for producing a three-dimensional representation of a body organ such as the heart, which representation can be worn somewhat like a glove or a mitten by the individual doing the demonstration. In its preferred form, the device is relatively flexible, and its outer surface represents the outer surface of the organ including the colors of the various landmarks of the organ along with the arteries and veins of the organ and other features which distinguish the organ. The present device is especially useful as a teaching device to enable an individual to produce a three-dimensional representation of an organ that can be viewed by a student or a patient or family member such that this person will have a better understanding of what is to take place. This may help the patient to understand the way the organ functions, which could in turn help the patient recover more quickly after surgery. Most forms of the present device are a glove or mitten like device which can be worn by the individual doing the demonstration. When worn, it can be used to represent the shape and motions of the organ by appropriate movements of the fingers, thumb and hand of the individual wearing the device. The present device is therefore very useful as a teaching tool to educate a patient going into or coming out of surgery. The device also provides a very convenient way to educate a medical or nursing student, including educating the student as to what is to take place during a surgical procedure and the affects that the surgery will have on the organ or organs of interest. The device can also be used to teach younger students simple anatomy and important structures in the human body. Another use for the device is in the field of veterinary medicine. This simple to use, three-dimensional device could be used by the veterinarian or his assistant to explain animal health problems and their solutions to pet owners who may not have a clear understanding of the anatomy of their animal or the problem affecting the animal. The device has many other applications and uses in creating a representation of a body organ in a human being as well as a body organ in an animal where it is necessary and desirable to be able to understand the nature of the organ and the procedure taking place. Another important object of the present invention resides in the fact it is relatively simple and easy to use and it can be placed on or near the body where the actual organ is located that is the subject of surgery or other medical procedures. Yet another object of the present invention is the fact the device will easily fit into an individual's pocket or attach to his clothing so it is readily accessible when needed. Thus the present device represents a useful teaching device which is three-dimensional in form, decorated to appear as it is in real life, and provides a better understanding of how an organ is constructed and functions than is available with present known means such a books, pictures, stand alone models, and verbal descriptions, and is easy for the individual to carry.

Since the present device can represent a number of different kinds of organs including the heart, lungs, liver, prostate, stomach, kidneys, genitals, and brain, as well as numerous other organs in humans and in animals, it is apparent that the present invention can be used in a wide variety of places and for many different purposes including to explain the shape, construction, and function of an organ. The device can also be used to identify where a particular procedure, such as a surgical procedure is to be performed in order to explain what will take place to a patient or to a student such as to a nursing or medical student. There are many advantages that are readily apparent from being able to demonstrate graphically and physically the construction and function of an organ. For example, a patient undergoing surgery will have a better idea of what is taking place and may have a better idea as to how to respond to the surgery after the surgery is completed.

DETAILED DESCRIPTION OF THE INVENTION

The present invention is a teaching device for representing the three-dimensional structure and function of an organ such as an organ of the human body. An individual uses the device by placing it on his hand and then forming a fist or other shape with that hand. The fist formed can be either full or slight depending on the organ and the condition of the organ being depicted. After forming a fist, the individual can hold that same hand against his body in a place which corresponds to the location of that organ in the body. For example, for the heart, the individual would make a full fist and then place that same hand against the upper middle portion of his chest, thereby forming a three-dimensional model of the heart clearly placed where it actually appears in the body. In contrast, if the organ depicted was the liver, the individual would make a slight fist, folding just the upper portions of his fingers and thumb, and then place that same hand on the middle right side of his torso. This represents the location of the liver in the human body.

The device can be manufactured from many different materials such as soft, flexible, and pliable materials which allow the hand to form a fist while at the same time are lightweight enough to easily fit in a pocket or easily attach to an individual's clothing. The device can be formed from fabric including cotton, polyester or any other suitable fabrics. It could also be formed from lightweight, soft, pliable plastic, latex, or any other suitable materials. It is also preferable that the material used be washable. The device 2, FIG. 1, can include various means of attachment for attaching to an individual's clothing, such as a clip, a snap, and/or hook and loop fastener 3.

Figure 1:
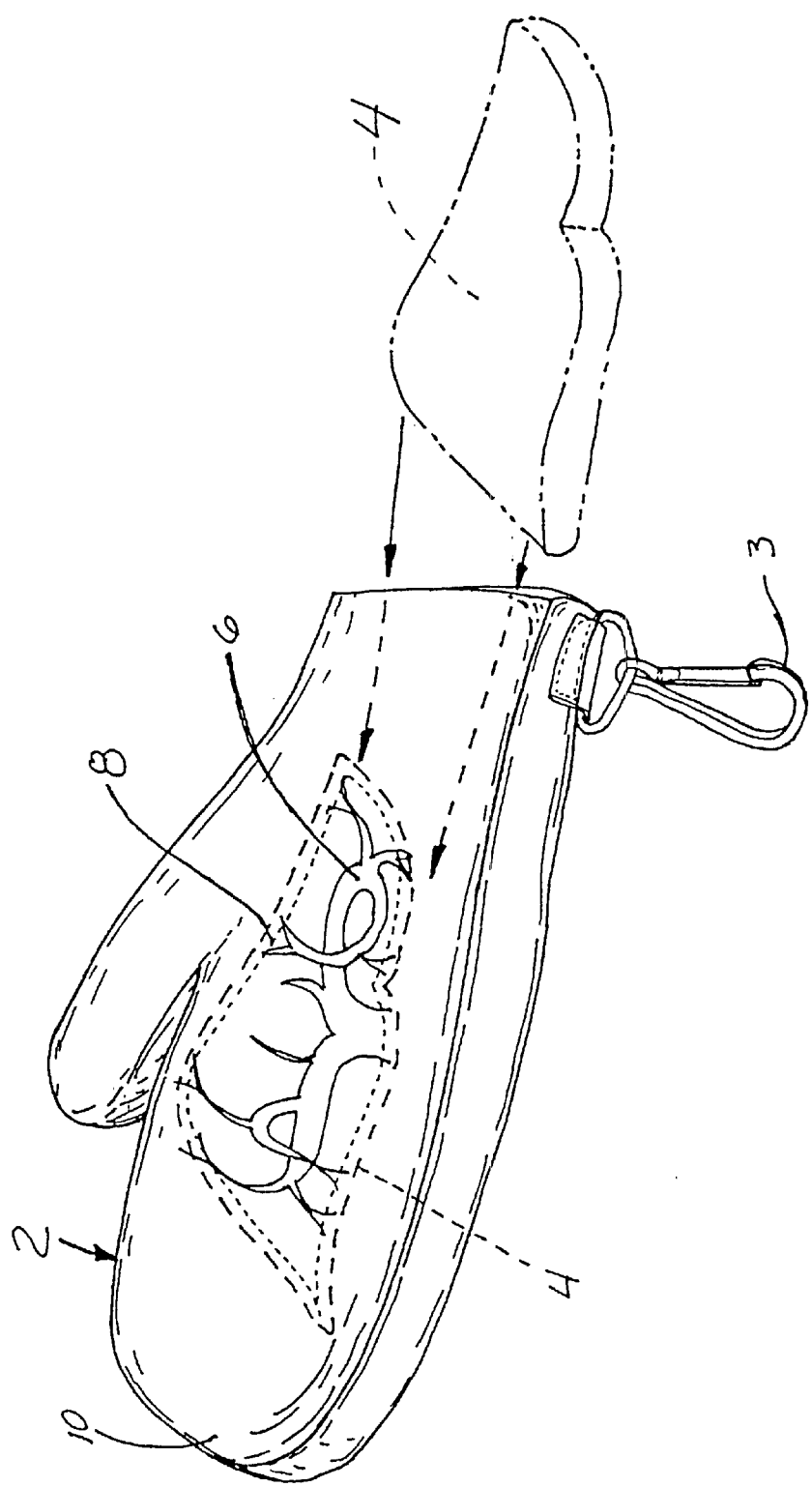
FIG. 1 is a perspective view of a device indicating how the three dimensional aspect of the device is formed.

The three-dimensional aspect of the device 2, FIG. 1, is achieved by using some form of filler 4 if the device 2 is made out of fabric. The filler 4 can include cotton, foam, or any other suitable material and is placed behind the depiction of the organ 6 and then stitched into place. Stitching 8 is also done around the filler 4 to keep it in the correct area of the device 2. If the device 2 is made of moldable material, the three-dimensional aspect of the device could also be made by molding the top 10 of the device 2 into the shape of the organ of interest. The teaching device can be colored so as to more accurately depict the organ of interest or to highlight structures or areas of particular interest on or in the organ. The device can also be made so that it has two or more passages for receiving the individual's fingers and thumb, or one passage which can receive the entire hand.

Figure 2:
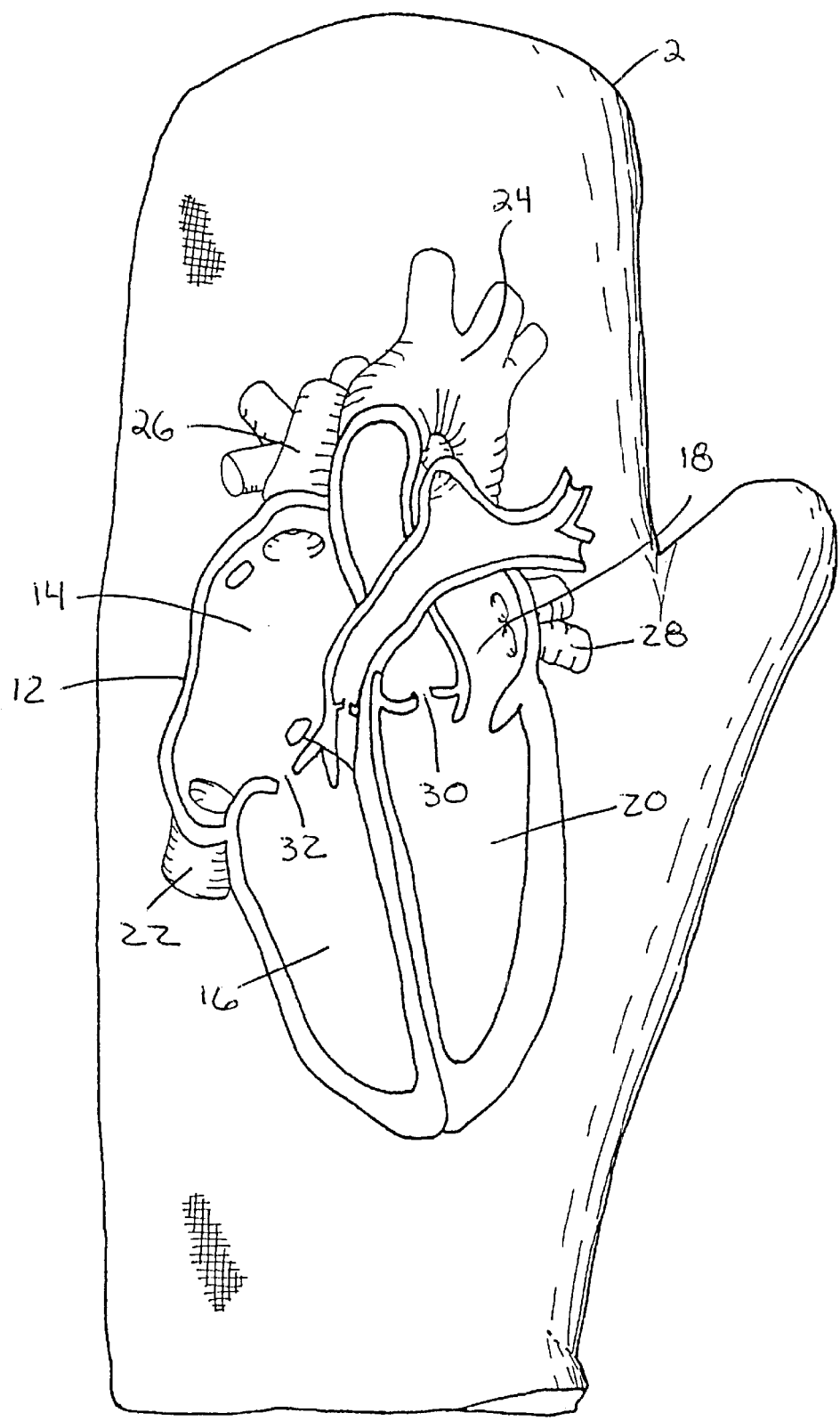
FIG. 2 is a perspective view of a device depicting the human heart indicating it's four chambers.
Figure 3:
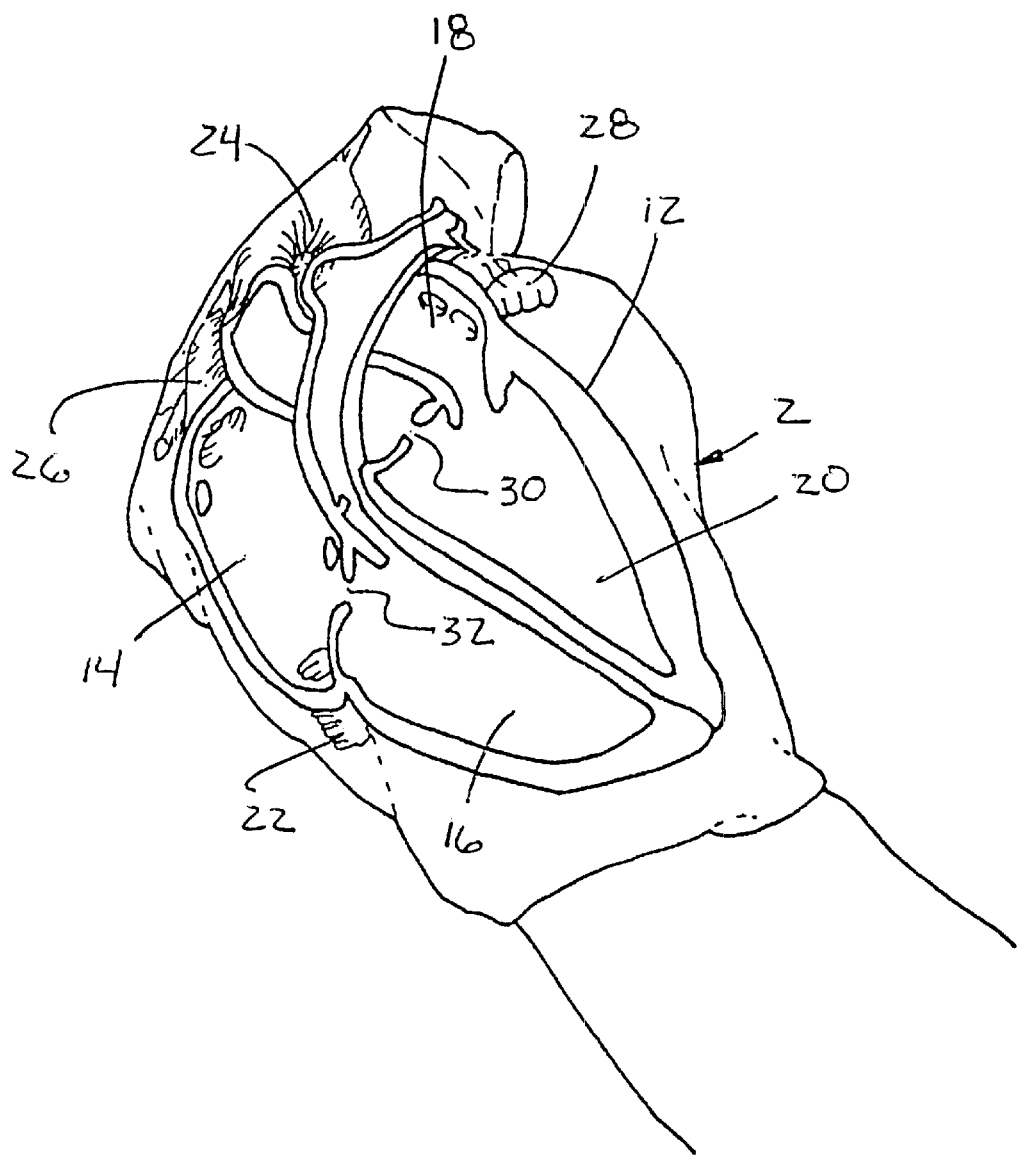
FIG. 3 is a perspective view of a device depicting the human heart as seen in FIG. 2, as the device is placed on an individual's hand and the individual has formed a fist.

One embodiment of the teaching device 2 is shown in FIGS. 2 and 3. This embodiment depicts the anatomy of the human heart 12 including the four chambers of the heart (14, 16, 18 and 20) which are the right atrium 14, the right ventricle 16, the left atrium 18 and the left ventricle 20. Also shown are the inferior vena cava 22, the ascending aorta 24, the superior vena cava 26, the pulmonary veins 28, the aortic value 30 and the tricuspid valve 32. The individual places the device 2 on his hand and forms a full fist with that hand, thus helping to accentuate the three dimensional model of the heart. Next, he places that hand against the middle of his chest indicating the actual location of the heart in the human body. Once in place, the individual can use the device to demonstrate structures and functions of the heart. This device is a useful tool in discussing the workings of the heart and the procedures involved in various operations with regards to the cardiac system. For patients with a pacemaker, the placement of the pacemaker wires into the right atrium 14 and/or the right ventricle 16 can also be depicted using this embodiment. For patients undergoing an electrophysiology study, the location of the various parts of the conduction system can be shown; as well as the four heart valves in the event of a valvular disorder.

Figure 6:
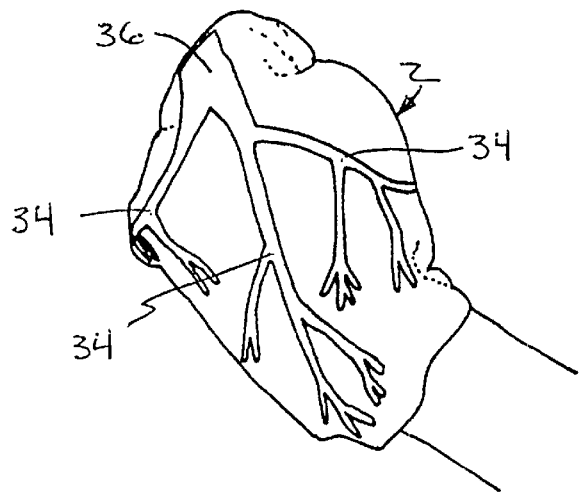
FIG. 6 is a perspective view of the device in FIG. 4 depicting the main epicardial coronary arteries off of the aortic root system of a human heart as the device is placed on an individual's hand and the individual has formed a fist.
Figure 4:
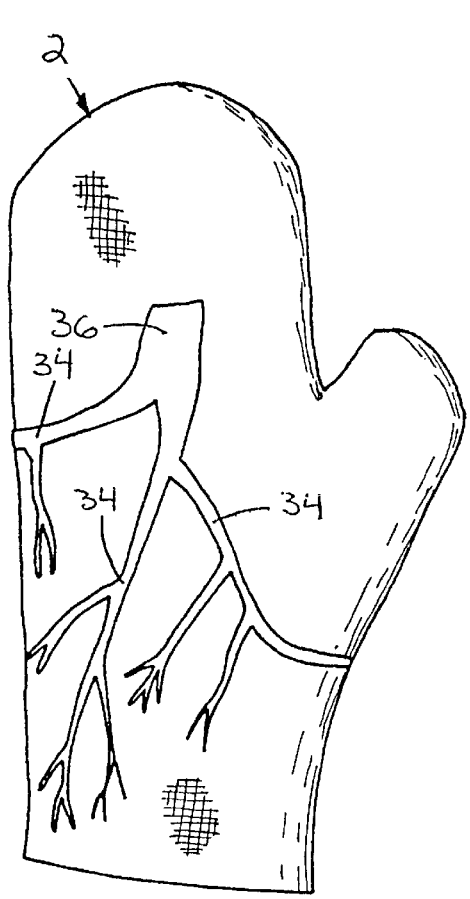
FIG. 4 is a perspective view of a device depicting the main epicardial coronary arteries off of the aortic root of a human heart.
Figure 5:
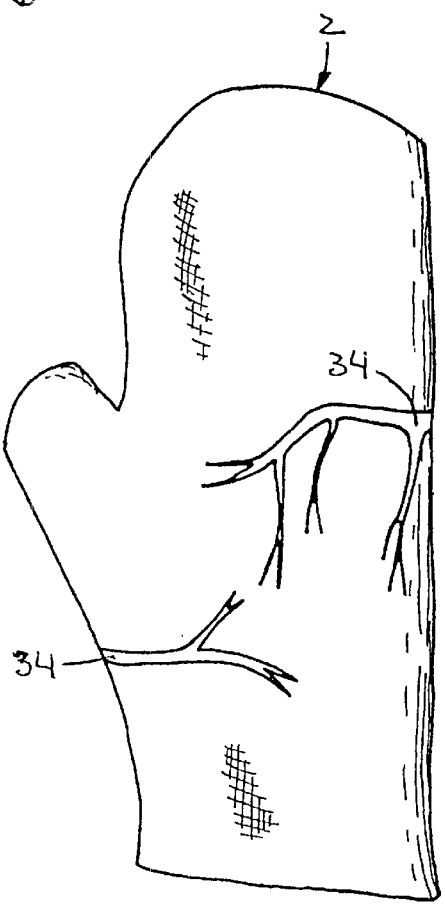
FIG. 5 is a back perspective view of the device in FIG. 4, depicting the main epicardial coronary arteries off of the aortic root system of a human heart.
Figure 8:
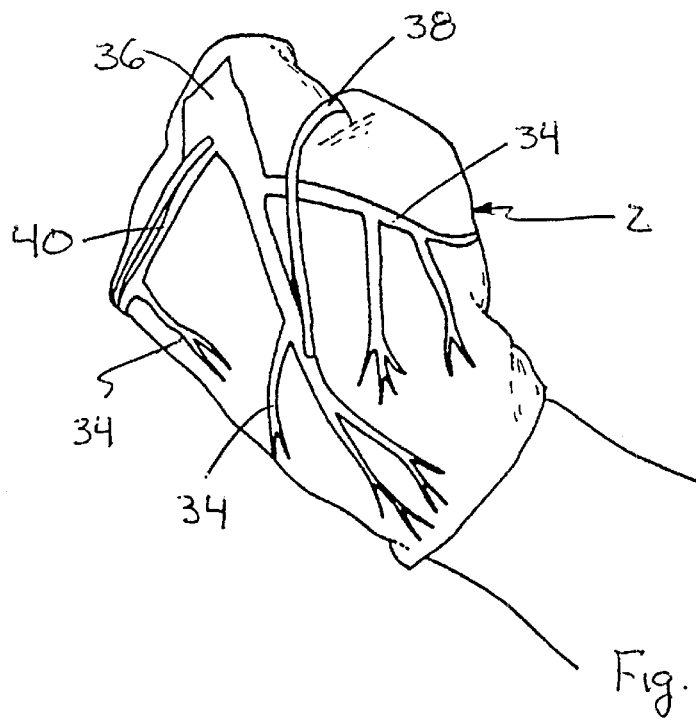
FIG. 8 is a perspective view of the device in FIG. 7, depicting the coronary anatomy of a human heart with bypass grafts in place as the device is placed on an individual's hand and the individual has formed a fist.
Figure 7:
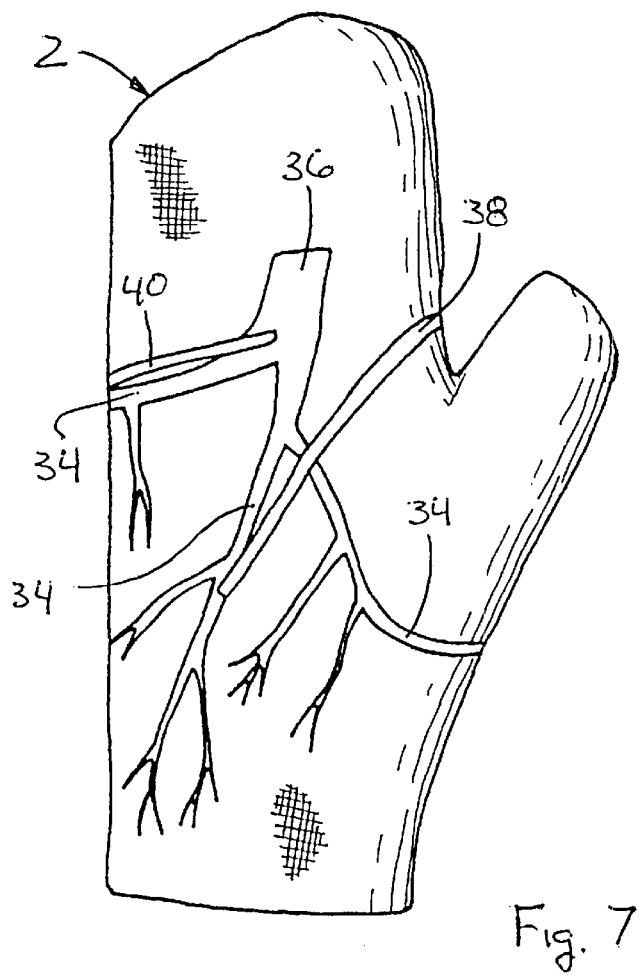
FIG. 7 is a perspective view of a device depicting the coronary anatomy of a human heart with bypass grafts in place.

In another embodiment, FIGS. 4–6, the teaching device 2 depicts the coronary anatomy. In this embodiment, the device 2 is used to indicate the position of the heart in the body and to show the epicardial coronary arteries 34 as they come off the aortic root 36. It can also be used to show the location of the saphenous vein by-pass graft 40 and/or an internal mammary graft 38, see FIGS. 7 and 8. In addition, it can be used to show the location of blockages in the arteries; and the placement of a catheter inside the actual artery for an angioplasty procedure. These diagrams are placed on the device in such a way that the patient can see a three-dimensional model of the human heart when the individual wears the device on his hand, forms a fist, and then places his fist on his own chest to indicate the general position of the heart, FIGS. 5 and 7. At that point, the individual can explain the coronary artery anatomy to the patient or student. The individual can also indicate where a bypass graft will be located if dealing with a patient undergoing this type of surgery. Use of this device will make it easier for a patient to understand a healthcare professional's discussion of the anatomy of the human heart. This will also make it easier for the patient to articulate any questions he may have with regards to his heart and the procedures he will be undergoing, since it is a simplified three-dimensional structure of the heart and it can be less intimidating to the patient than other models which are highly specialized. This device is designed to improve communication between healthcare professionals and their patients. The device is also a good general teaching tool in classrooms to teach cardiac anatomy.

Figure 9:
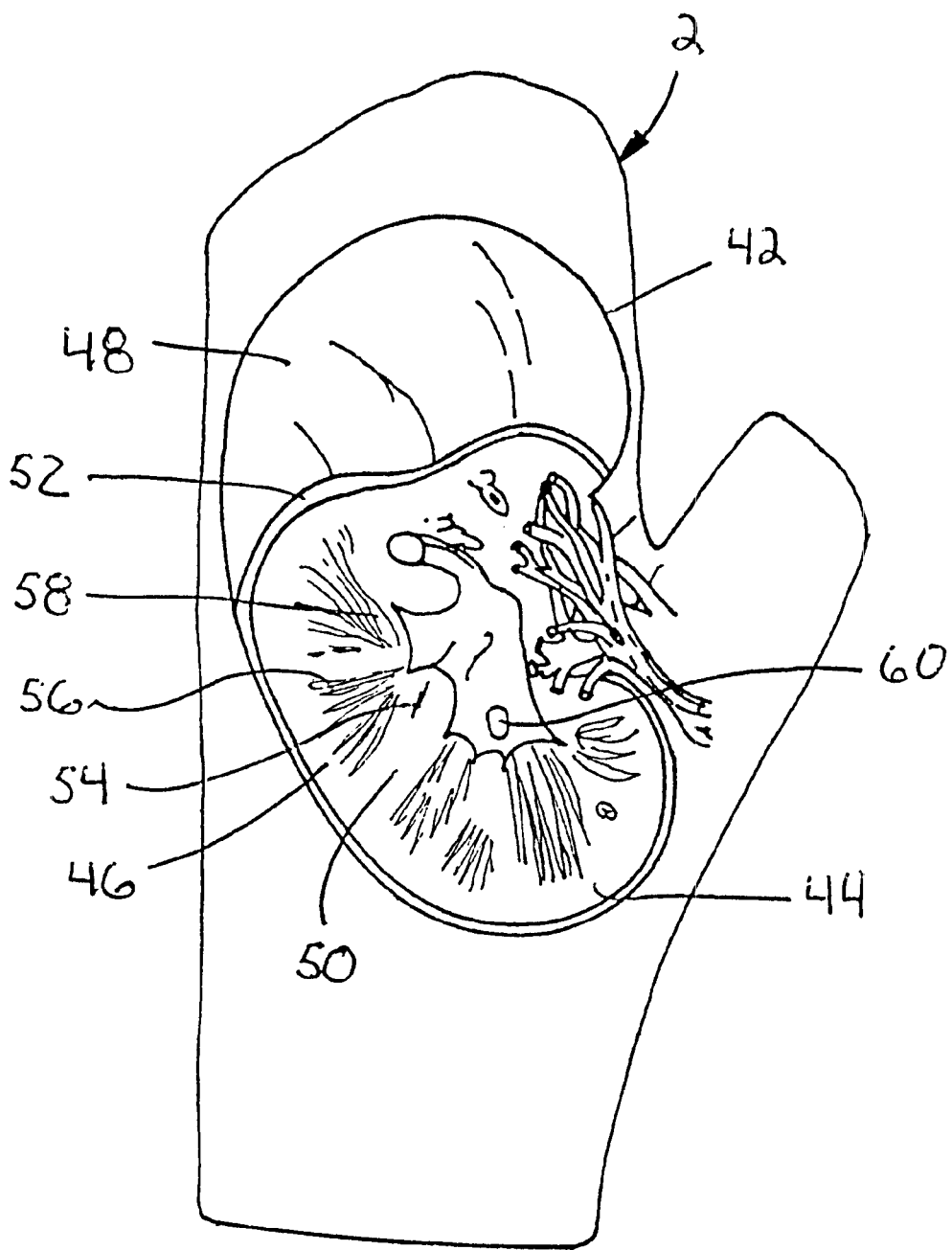
FIG. 9 is a perspective view of a device depicting the human kidney.

FIG. 9 shows an embodiment of the device 2 depicting a human kidney 42, in this case a left kidney partially sectioned. Various anatomical attributes of the kidney 42 are indicated such as the superior segment 44, the posterior segment 46, the inferior segment 48, the renal cortex 50, the capsule 52, the renal column 54, the renal medulla 56, the calyx 58, and the cribriform area of papilla 60. Once the individual has placed the device 2 on his hand, he makes a slight fist and then, since this is the left kidney, places his hand on his lower left back in such a way so that his fist is pointing downward. This represents the general location of the left kidney in the human body. The advantages of using this as a teaching tool are numerous. First, it is simple and easy to understand. Second, it clearly indicates the position of the kidneys in the human body. Third, as shown from this embodiment, the teaching device can have as much or as little detail as is required to aid in informing patient's of their health problems and/or teaching students the key anatomical attributes of the organ of interest.

Figure 10:
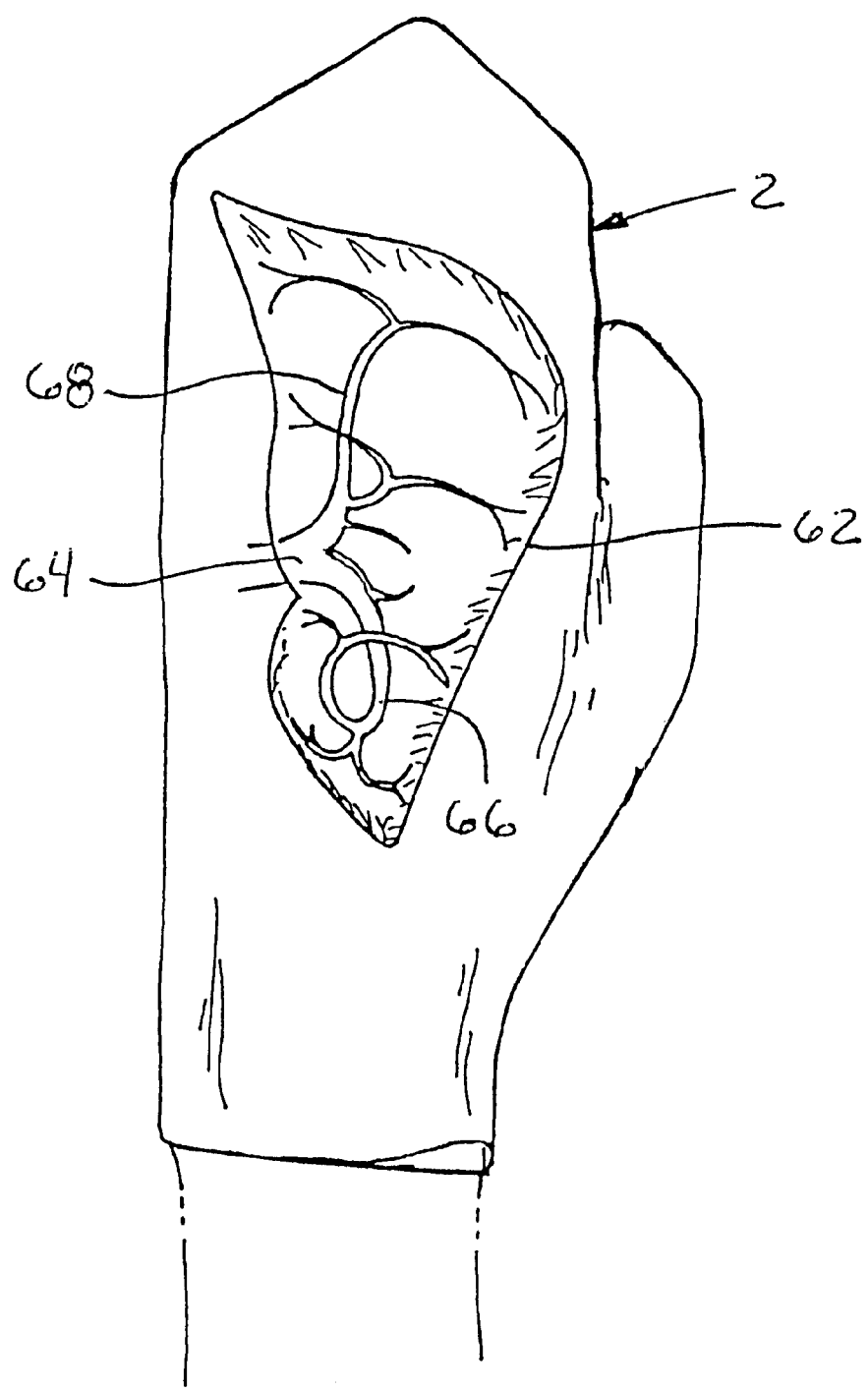
FIG. 10 is a perspective view of a device depicting the human liver.

Another embodiment of the teaching device 2 depicts the liver 62, FIG. 10. This depiction includes the portal vein 64 and indicates the left portal branch 66 of the portal vein 64 and the right portal branch 68 of the portal vein 64. The individual places the device 2 on his hand, forms a slight fist to enhance the three-dimensional quality of the liver depicted on the device and places his hand against his mid-right torso so that his fist is pointing sideways in order to indicate the general location of the liver in the human body. Again, although not shown in this embodiment, it would be possible to show a partially or fully sectioned liver in order to indicate the anatomical attributes inside the liver.

Figure 11:
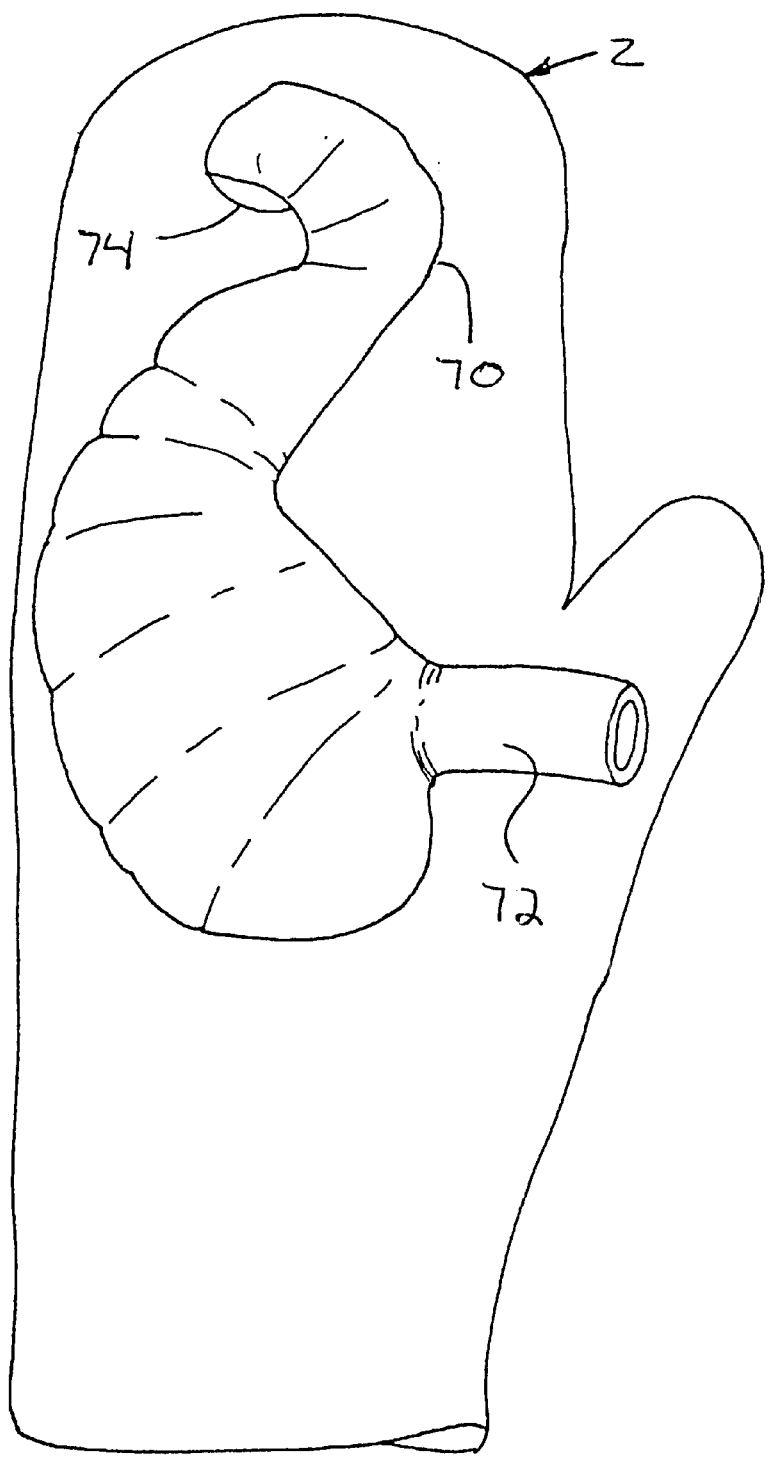
FIG. 11 is a perspective view of a device depicting the human stomach.

Another embodiment depicts the stomach 70, FIG. 11. As with the embodiment depicting the liver, this shows a view of the outside of the stomach 70, the esophagus 72 leading into the stomach 70 and the small intestine 74 leading from the stomach 70 to the large intestine. After placing the device 2 on his hand, the individual makes a slight fist and places his hand in the upper mid-torso of his body in such a way that his fist is pointing sideways, thus indicating the location of the stomach in a human body.

In the veterinary medicine field, the individual would place the device on his hand and form his hand into the proper position to accentuate the three-dimensional character of the device and then place the hand wearing the device against the animal in such a place as to approximate the location of the organ of interest on the animal.

The embodiments described hereinabove are representative of the present invention for a device for representing the structure and operation of a body organ. It is intended that various organs may be represented by this device and therefore it is understood that other embodiments to organs not specifically described above are possible, such as to the spleen, the pancreas, the bladder, the intestines, and so forth.

There has been shown and described various embodiments of a device which can be used to demonstrate, in a three-dimensional way, the anatomy and function of an organ such as an organ in a living being.

Other aspects, objects and advantages of the present invention can be obtained from a study of the drawings, the disclosure and the appended claims.

I claim:

1. A teaching model of a single human organ, in the form of a flexible glove or mitt, to be worn by an instructor; said glove or mitt having an outer surface and said outer surface having depicted thereon:

(a) the outer shape of said organ, and
   (b) indicia selected from the group consisting of the organ's internal anatomical attributes, locations for surgical cites, representations of functional operation, and mixtures thereof;

whereby an instructor wearing the glove or mitt, forming a fist, and directing movement of the glove or mitt can conveniently and efficiently demonstrate the organ's proximate location in the body, its typical movement's and other medical, anatomical, surgical, structural or functional lessons.

2. The teaching model of claim 1, wherein the outer surface of the model is colored to accurately represent the colors of the body organ that is being demonstrated.

3. The teaching model of claim 1, wherein the glove or mitt is washable.

4. The teaching model of claim 1, wherein said model includes a means for attaching said model to clothing.

5. The teaching model of claim 4, wherein said means for attaching is a clip.

6. The model of claim 4, wherein said means for attaching is a snap.

7. The model of claim 4, wherein said means for attaching is a hook and loop fastener.

8. The teaching model of claim 1, wherein said model has one passage for receiving the instructor's fist.

9. The model of claim 1 being constructed of fabric.

10. The model of claim 1, being constructed of pliable plastic.

11. The model of claim 1, being constructed of latex.

12. The model of claim 1, containing a filler under the outer surface, said filler being in the shape of the organ of the body represented on said model.

13. The model of claim 12 having a perimeter for the fillers and, being stitched at said perimeter of the filler to emphasize the organ of the body represented.

14. The teaching model of claim 1, wherein the outer surface is molded into the shape of the organ of the body represented.

15. The teaching model of claim 1, wherein the organ of the body depicted is a human heart and its four chambers.

16. The teaching model of claim 15, having an indication of where a pacemaker's wires are placed in the heart.

17. The teaching model of claim 15, having a representation of the heart's conduction system.

18. The teaching model of claim 1, wherein the organ of the body depicted is a human heart and the location of epicardial coronary arteries.

19. The teaching model of claim 18 further depicting placement of a saphenous vein by-pass graft and placement of an internal mammary graft.

20. The model of claim 17 further depicting placement of a catheter for angioplasty.

21. The teaching model of claim 1, wherein the organ of the body depicted is a kidney.

22. The teaching model of claim 1, wherein the organ of the body depicted is a liver.

23. The model of claim 1, wherein the organ of the body represented is a stomach.

* * * * *